( 12 ) United States Patent
Oami

(10) Patent No.: US 12,200,407 B2
(45) Date of Patent: *Jan. 14, 2025

(54) VIDEO MONITORING APPARATUS, CONTROL METHOD THEREOF, AND COMPUTER READABLE MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/242,667

(22) Filed: Sep. 6, 2023

(65) Prior Publication Data

US 2023/0412774 A1 Dec. 21, 2023

Related U.S. Application Data

(63) Continuation of application No. 17/741,607, filed on May 11, 2022, now Pat. No. 11,924,585, which is a
(Continued)

(51) Int. Cl.
H04N 7/18 (2006.01)
G06T 7/70 (2017.01)
H04N 23/695 (2023.01)

(52) U.S. Cl.
CPC ............. H04N 7/183 (2013.01); G06T 7/70 (2017.01); H04N 23/695 (2023.01);
(Continued)

(58) Field of Classification Search
CPC ......... H04N 7/183; H04N 23/695; G06T 7/70
(Continued)

(56) References Cited

U.S. PATENT DOCUMENTS

2010/0177968 A1    7/2010  Fry ..................... A61B 5/349
                                                        382/224
2016/0328827 A1*  11/2016  Ilic ...................... G06T 3/4038

FOREIGN PATENT DOCUMENTS

JP    2001-142138 A    5/2001
JP       3257165 B2    2/2002
(Continued)

OTHER PUBLICATIONS

Ohno, Hiroshi, "A Proposal of Shoplifting Countermeasures by the Suspicious Activity Detection", Security Management, Apr. 30, 2009, pp. 26-38, vol. 23, No. 1.
(Continued)

Primary Examiner — Amir Shahnami

(57) ABSTRACT

A position and pose determination unit (103) is configured to determine a position and an pose of the video acquisition unit (110) in such a way that a level of hiding caused by overlapping of objects becomes low based on environmental object information indicating an environmental object including a structural object present in the monitored area and a placed object placed in the structural object, and staying characteristic information indicating a staying characteristic of the object determined depending on the environmental object. The analysis and display unit (111) is configured to perform at least one of analyzing a video captured by the video acquisition unit (103) at the position and the pose determined by the position and pose determination unit (110) and displaying the video.

20 Claims, 13 Drawing Sheets

Related U.S. Application Data continuation of application No. 16/981,898, filed as application No. PCT/JP2018/013230 on Mar. 29, 2018, now Pat. No. 11,381,782.

(52) U.S. Cl.
CPC .............. *G06T 2207/10016* (2013.01); *G06T 2207/30232* (2013.01); *G06T 2207/30244* (2013.01)

(58) Field of Classification Search
USPC ........................................................ 348/143
See application file for complete search history.

(56) References Cited

FOREIGN PATENT DOCUMENTS

| | | |
|---|---|---|
| JP | 2006-197226 A | 7/2006 |
| JP | 2012-010210 A | 1/2012 |
| JP | 2013-106175 A | 5/2013 |
| WO | 2014/002398 A1 | 1/2014 |
| WO | 2014/203389 A1 | 12/2014 |

OTHER PUBLICATIONS

Murakami, Kazuhito, "Multi-camera Layout method for minimizing concealment for the RoboCup small-size league", Eizojoho Industrial, Aug. 1, 2007, pp. 67-72, vol. 39, No. 8.
International Search Report for PCT/JP2018/013230, dated May 1, 2018.

\* cited by examiner (A″)

(B″)

(C)

(D)

VIDEO MONITORING APPARATUS, CONTROL METHOD THEREOF, AND COMPUTER READABLE MEDIUM

CROSS REFERENCE TO RELATED APPLICATIONS

The present application is a continuation application of U.S. patent application Ser. No. 17/741,607 filed on May 11, 2022, which is a continuation application of U.S. patent application Ser. No. 16/981,898 filed on Sep. 17, 2020, which issued as U.S. Pat. No. 11,381,782, which is a National Stage Entry of international application PCT/JP2018/013230 filed on Mar. 29, 2018, the disclosures of all of which are incorporated in their entirety by reference herein.

TECHNICAL FIELD

The present disclosure relates to a video monitoring apparatus that monitors a video using a video acquisition unit.

BACKGROUND ART

Various video monitoring apparatuses for monitoring videos captured by a camera have been proposed. For example, Patent Literature 1 discloses a technique of arranging a plurality of cameras in a monitored area, and detecting and tracking an object with the cameras. The technique disclosed in Patent Literature 1 presents a behavior state of the object on a monitoring area of a monitoring screen based on a result of the tracking.

On the other hand, Patent Literature 2 discloses a technique of evaluating whether a camera layout is suitable for video processing when cameras are placed in a monitored area. According to the technique disclosed in Patent Literature 2, it is evaluated whether the camera layout (an orientation and position of the camera) is suitable for specific video processing based on whether an object is hidden behind an obstacle, a resolution, and an angle of a gaze point when viewed from the camera and then displays a result of the evaluation. It is possible to construct a monitoring apparatus suitable for video processing such as human detection by designing the monitoring apparatus using the technique disclosed in Patent Literature 2.

CITATION LIST

Patent Literature

Patent Literature 1: Japanese Patent No. 3257165
Patent Literature 2: International Patent Publication No. WO 2014/002398

SUMMARY OF INVENTION

Technical Problem

However, Patent Literature 1 does not disclose a camera layout suitable for monitoring an object appearing in a video.

Further, the technique disclosed in Patent Literature 2 considers a structure of the monitored area and a fixed structural object placed inside the monitored area. However, the technique disclosed in Patent Literature 2 does not consider about information such as where an object to be monitored is likely to stay and where and how much objects are hidden, and thus does not consider about the possibility in which the objects overlap with each other and the camera layout becomes unsuitable for video processing. For this reason, with the technique disclosed in Patent Literature 2, the camera layout may not be necessarily suitable for video monitoring under a situation where a plurality of objects are present inside the monitored area and overlap with each other.

An example object of the present disclosure is to solve one of the above-described problems and to provide a video monitoring apparatus that can monitor a video more appropriately even under a situation where objects overlap with each other in a monitoring area.

Solution to Problem

In an example aspect, a video monitoring apparatus for monitoring inside a monitored area using a video acquisition unit. The video monitoring apparatus includes:
a position and pose determination unit configured to determine a position and an pose of the video acquisition unit in such a way that a level of hiding caused by overlapping of objects becomes low based on environmental object information indicating an environmental object including a structural object present in the monitored area and an placed object placed in/on the structural object and staying characteristic information indicating a staying characteristic of the object determined depending on the environmental object; and
an analysis and display unit configured to perform at least one of analyzing a video captured by the video acquisition unit at the position and the pose determined by the position and pose determination unit and displaying the video.

In another example aspect, a method of controlling video monitoring apparatus for monitoring inside a monitored area using a video acquisition unit. The method includes:
determining a position and an pose of the video acquisition unit in such a way that a level of hiding caused by overlapping of objects becomes low based on environmental object information indicating an environmental object including a structural object present in the monitored area and an placed object placed in/on the structural object and staying characteristic information indicating a staying characteristic of the object determined depending on the environmental object; and
performing at least one of analyzing a video captured by the video acquisition unit at the determined position and the determined pose and displaying the video.

In another example aspect, a non-transitory computer readable medium stores a program for causing a computer to monitor inside a monitored area using a video acquisition unit. The program causes the computer to execute:
a procedure of determining a position and an pose of the video acquisition unit in such a way that a level of hiding caused by overlapping of objects becomes low based on environmental object information indicating an environmental object including a structural object present in the monitored area and an placed object placed in/on the structural object and staying characteristic information indicating a staying characteristic of the object to be monitored determined depending on the environmental object; and a procedure of performing at least one of analyzing a video captured by the video acquisition unit at the determined position and the determined pose and displaying the video.

Advantageous Effects of Invention

According to the above example aspects, it is possible to provide a video monitoring apparatus that can monitor a video more appropriately even under a situation where objects overlap with each other in a monitoring area.

DESCRIPTION OF EMBODIMENTS

Hereinafter, embodiments of the present disclosure will be described with reference to the drawings. The following descriptions and drawings are omitted and simplified as appropriate for clear descriptions. Further, in the following drawings, the same elements are denoted by the same signs, and repeated descriptions are omitted as necessary.

Figure 1:
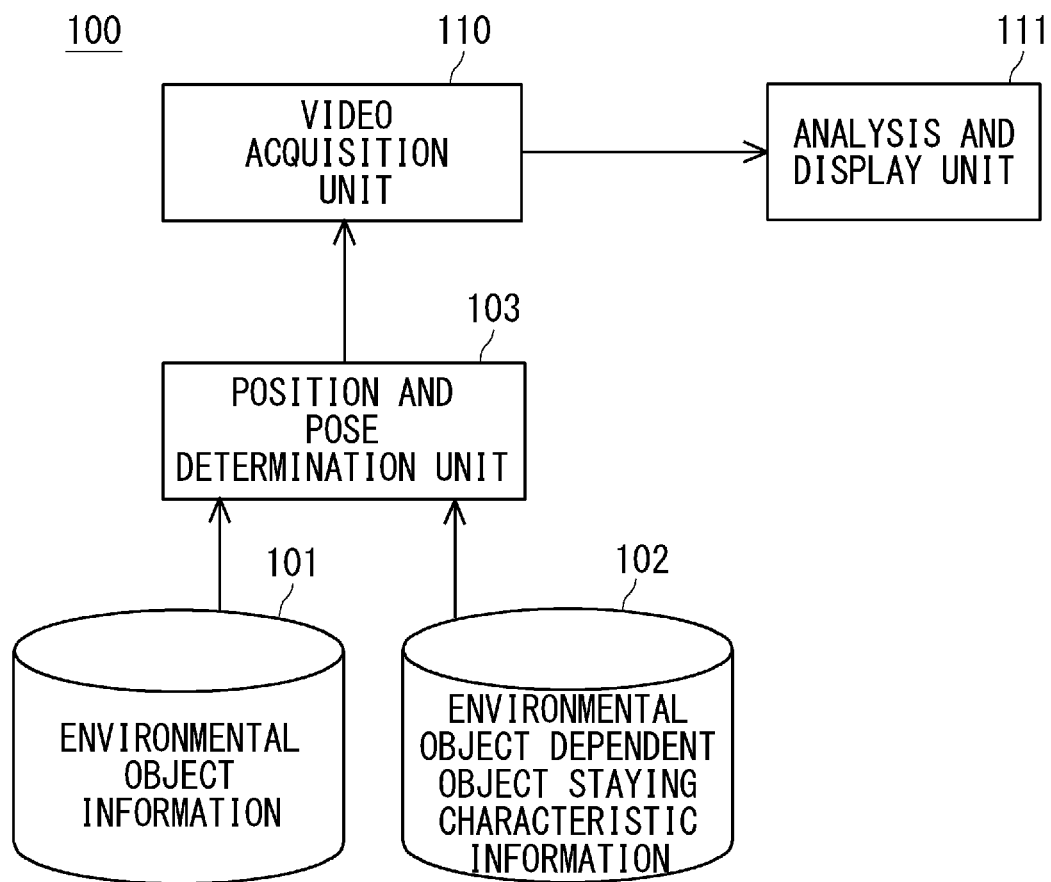
FIG. 1 is a block diagram showing a configuration example of a video monitoring apparatus 100 according to a first embodiment of the present disclosure.

Referring to FIG. 1, FIG. 1 shows a configuration example of a video monitoring apparatus 100 according to a first embodiment of the present disclosure. The video monitoring apparatus 100 includes a video acquisition unit 110, an analysis and display unit 111, an environmental object information storage unit 101, an environmental object dependent object staying characteristic information storage unit 102, and a position and pose determination unit 103.

The video acquisition unit 110 captures a video of a monitored area and outputs the captured video to the analysis and display unit 111.

The analysis and display unit 111 performs at least one of analyzing the video output from the video acquisition unit 110 and displaying it.

Here, the video acquisition unit 110 is installed in a monitoring area or in the vicinity thereof to capture the inside of the monitoring area. A position and pose of the video acquisition unit 110 are determined based on video acquisition unit layout information determined by the position and pose determination unit 103.

The position and pose determination unit 103 determines the above video acquisition unit layout information based on the environmental object information of the monitoring area stored in the environmental object information storage unit 101 and environmental object dependent object staying characteristic information stored in the environmental object dependent object staying characteristic information storage unit 102.

Next, an operation of the video monitoring apparatus 100 shown in FIG. 1 will be described.

The video acquisition unit 110 is a device for capturing the inside of the monitoring area. Various cameras used for video monitoring such as analog cameras and IP (Internet Protocol) cameras (network cameras) can be used as the video acquisition unit 110. In addition to a visible light camera, a camera of a wavelength other than visible light, such as an infrared camera can also be used according to the application as the camera. In the following descriptions, the video acquisition unit is also simply referred to as a camera.

Here, the layout (position and pose) of the video acquisition unit 110 is determined based on the video acquisition unit layout information determined by the position and pose determination unit 103, which will be described later. The video acquisition unit layout information is related to the position and pose of the video acquisition unit 110 placed in a certain monitored area. The video acquisition unit layout information includes information such as the position and an installation height of the video acquisition unit 110, an orientation of the video acquisition unit 110 (the pose of the video acquisition unit 110), and a zoom amount (how wide the angle of view is) in the monitored area. The video acquisition unit layout information is described in association with environmental object information, which will be described later. For example, when the environmental object information is supplied as drawing information of the monitored area, the video acquisition unit layout information may be represented by coordinates of the drawing. Alternatively, the video acquisition unit layout information may be represented in a real world coordinate system defined with a certain point on a real space as an origin. Information such as the orientation and a zoom ratio of the video acquisition unit 110 of the video acquisition unit layout information may be described by a camera parameter which determines this information. Note that the installation and adjustment of the video acquisition unit 110 based on the video acquisition unit layout information may be performed automatically or manually. The video captured by the video acquisition unit 110 is output to the analysis and display unit 111.

The analysis and display unit 111 presents the video input from the video acquisition unit 110 to an observer. Then, the observer can know a situation of a monitored object in the monitored area.

Alternatively, the analysis and display unit 111 may analyze the video input from the video acquisition unit 110, perform detection and tracking processing of the object to be monitored, and present a result of the detection and tracking processing together with the video. For example, the analysis and display unit 111 may surround the detected object with a rectangle and present it or allocate an ID (identifier) to the object according to the result of tracking the object, and present a value of the ID together with the object. Alternatively, the analysis and display unit 111 may detect an abnormal behavior of the object based on the result of detecting and tracking the object and issue an alert. Further, the analysis and display unit 111 may issue an alert when the object intrudes into a specific area. These processes may be carried out by various existing methods.

Note that the analysis and display unit 111 may display only the result of analyzing the video without displaying the video itself. For example, the analysis and display unit 111 may display the position and a movement trajectory of the object on a map based on the result of tracking. Then, when the observer wants to check the video captured by the specific video acquisition unit 110, the analysis and display unit 111 may issue a display processing command to thereby present the video on the screen.

Next, an operation of the position and pose determination unit 103 will be described.

The position and pose determination unit 103 receives the environmental object information of the monitoring area stored in the environmental object information storage unit 101, and the environmental object dependent object staying characteristic information stored in the environmental object dependent object staying characteristic information storage unit 102.

Here, the environmental object information is information about a structural object described in a drawing of the inside of the monitored area and information about a placed object placed in the structural object. Specifically, the structural object is a pillar, a wall, a fixture, lighting hanging from the ceiling, an advertisement, a display, a direction board, etc. placed in the monitored area. The structural object information is information such as a three-dimensional position and a size (both the three-dimensional position and the size include height information), a shape, an orientation, etc. of the structural object placed in the monitored area. The term "placed object" refers to an object placed in/on the structural object placed in the monitored area. When the inside of a store is the monitored area, the placed object is, for example, an item placed in/on a fixture placed as a structural object in the store. The placed object information is related to a type of the placed object placed in the structural object. For example, when the inside of a store is the monitored area, drawing information of a structural object such as a fixture and the like placed in the store and information of a type of an item placed in the fixture are input as the environmental object information. In the structural object information, the information about the position and the height of the structural object may be represented by coordinates in the drawing or may be represented in a real world coordinate system.

On the other hand, the environmental object dependent object staying characteristic information is related to a staying characteristic of the object to be monitored determined depending on the environmental object. For example, when the monitored area is a store, and the object is a person, persons lining up in a queue are likely to stay in front of a cash register inside the store. Moreover, persons browsing tend to stay in front of a book corner inside the store. It can be said that an occurrence of such a situation depends on structural objects such as cash registers and placed objects such as books. As a result, such places have a staying characteristic in which objects tend to overlap with each other due to the staying of the objects, and thus objects are likely to be hidden. The environmental object dependent object staying characteristic information indicates such a staying characteristic. The environmental object dependent object staying characteristic information may include, for example, a spatial parameter describing the staying characteristic (information about a staying position, a staying interval, or a position and an orientation of a line along which a plurality of staying objects line up (hereinafter referred to as a staying line)), a frequency of staying, and a staying duration. Alternatively, information that defines a value calculated based on the value such as the staying duration and represents a staying level may be used as the environmental object dependent object staying characteristic information. Further alternatively, hiding level information calculated based on the staying characteristic and an index such as a hiding level may be used as the environmental object dependent object staying characteristic information. Details of the environmental object dependent object staying characteristic information will be described in specific examples.

The position and pose determination unit 103 determines the layout (position and pose) of the video acquisition unit 110 from the environmental object information and the environmental object dependent object staying characteristic information. In this case, the position and pose determination unit 103 considers the hiding level caused by the staying of the objects.

The hiding level here represents a level of hiding caused by the overlapping of the objects and can be divided into a spatial hiding level and a temporal hiding level (or a hiding level considering both of the levels). The spatial hiding level is an index indicating how much an object is hidden spatially and can be represented by a ratio of an area of a hidden part of an object to an entire area of the object appearing in the video (the ratio may be also referred to as a spatial hiding ratio). On the other hand, the temporal hiding level is an index indicating how hidden an object is temporally and can be defined by a duration of the hiding. A total hiding level can be indicated by integrating the spatial hiding level with the temporal hiding level. A value calculated by multiplying the spatial hiding level by the temporal hiding level may be used as the total hiding level. However, the integration method is not limited to this, and instead any existing integration method may be used. Specific examples of the spatial hiding level and temporal hiding level will be described later.

The position and pose determination unit 103 determines the layout of the video acquisition unit 110 so as to lower the hiding level. Hereinafter, the term "layout" includes not only the position of the video acquisition unit but also its pose information. For example, the position and pose determination unit 103 generates a plurality of layouts of the video acquisition unit 110, and determines a layout in which the hiding level becomes the smallest among the plurality of layouts. Alternatively, the position and pose determination unit 103 sets a value to be satisfied by the hiding level as a threshold, and obtains a layout in which the hiding level becomes equal to or less than the threshold. Then, the position and pose determination unit 103 may determine the most desirable layout according to the other indices among the plurality of acquired layouts. Other indices include, for example, a resolution (size) of the object to be monitored in the video, the orientation of the object, and the angle at which the object is captured (a depression angle). In particular, when the video processing is performed by the analysis and display unit 111, the layout is preferably suitable for the video processing. Thus, the position and pose determination unit 103 selects an optimum layout according to the characteristic of the video processing. In the following descriptions, the layout of the video acquisition unit is also referred to simply as a camera layout.

The video monitoring apparatus 100 shown in FIG. 1 considers the staying characteristic of the object, obtains the layout of the video acquisition unit 110 in which the hiding level becomes low, and performs video monitoring using the video captured with the acquired layout. Thus, even when a plurality of objects stay, video monitoring can be appropriately performed.

Hereinafter, this embodiment will be described by showing specific examples.

Figure 2A:
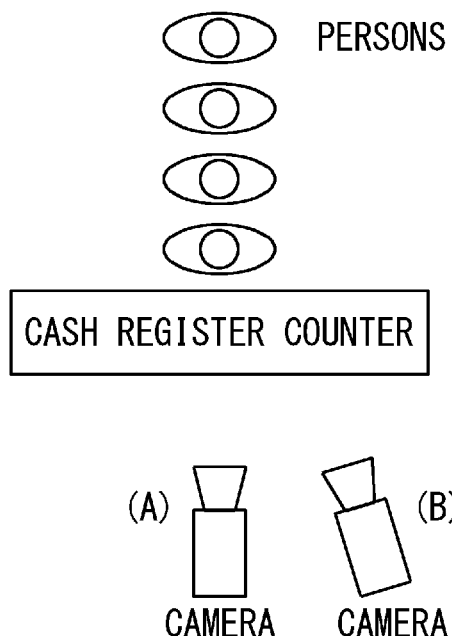
FIG. 2A is a view showing a camera layout example of cameras for capturing persons lining up at a cash register counter.
Figure 2B:
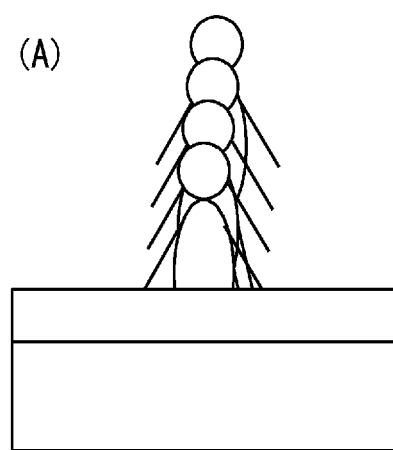
FIG. 2B is a view showing an example of a video assumed when the video is captured with a camera layout (A) of FIG. 2A.
Figure 2C:
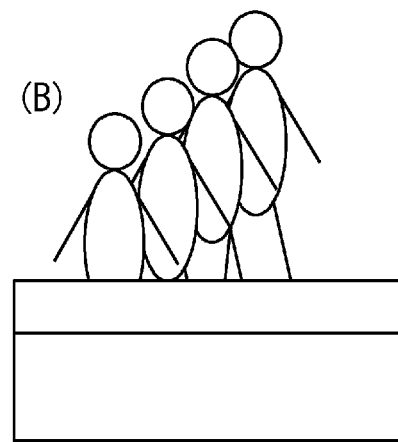
FIG. 2C is a view showing an example of a video assumed when the video is captured with a camera layout (B) of FIG. 2A.

(Specific Example 1) When the Structural Object of the Environmental Object is a Cash Register Counter FIG. 2A shows a camera layout example of the video acquisition unit 110 (hereinafter also simply referred to as a camera 110) for capturing persons lining up at a cash register counter, and is a view seen from directly above. Two types of camera layouts (A) and (B) are shown in FIG. 2A. The camera layout (A) shows a camera layout for capturing persons lining up in front of the cash register counter from the side of the cash register counter, and the camera layout (B) shows a camera layout for capturing the persons lining up at the cash register counter obliquely from the front. FIG. 2B is an example of a video of persons assumed to be captured with the camera layout (A), and FIG. 2C is an example of a video of persons assumed to be captured with the camera layout (B). When the assumed video processing is person detection, the less overlap between persons, the easier it is to detect a person. Therefore, when the assumed video processing is person detection, the position and pose determination unit 103 selects the camera layout (B) between the camera layout examples of FIG. 2A. Hereinafter, a method of calculating the spatial hiding level in each case of the camera layout (A) and (B) will be described.

First, the position and pose determination unit 103 generates two camera layouts (A) and (B) as candidates for the camera layout (position and pose of the camera 110) of the camera 110. The position and pose determination unit 103 determines a positional relation between the structural object (in this case, the cash register counter) in the monitored area and the camera 110 from the camera layouts (A) and (B) and the environmental object information as shown in FIG. 2A. Along with this, the position and pose determination unit 103 can also determine the position at which customers line up at the time of checkout, and a positional relation between this position and the camera 110 (the distance from the camera 110 to the queue and the angle of the camera 110 with respect to the queue). Note that when the position where the queue is to be formed is specified in advance, the position is included in the environmental object information together with the structural object information, and then input.

Figure 3A:
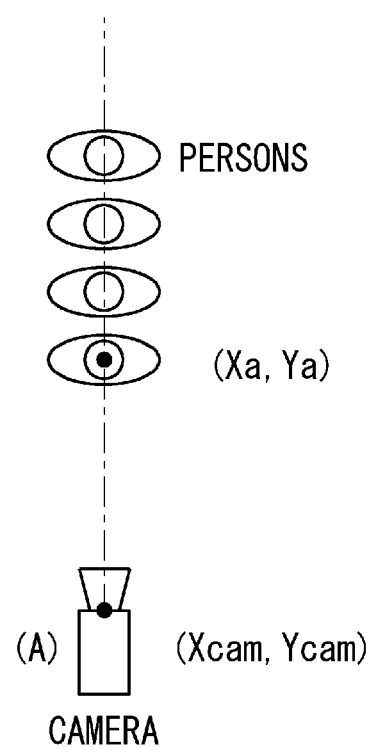
FIG. 3A is a top view of the camera layout (A) of FIG. 2A.
Figure 3B:
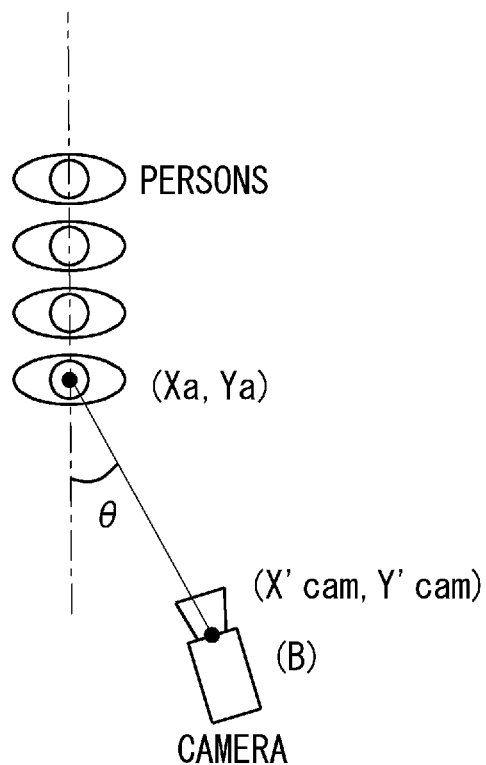
FIG. 3B is a top view of the camera layout (B) of FIG. 2A.
Figure 4:
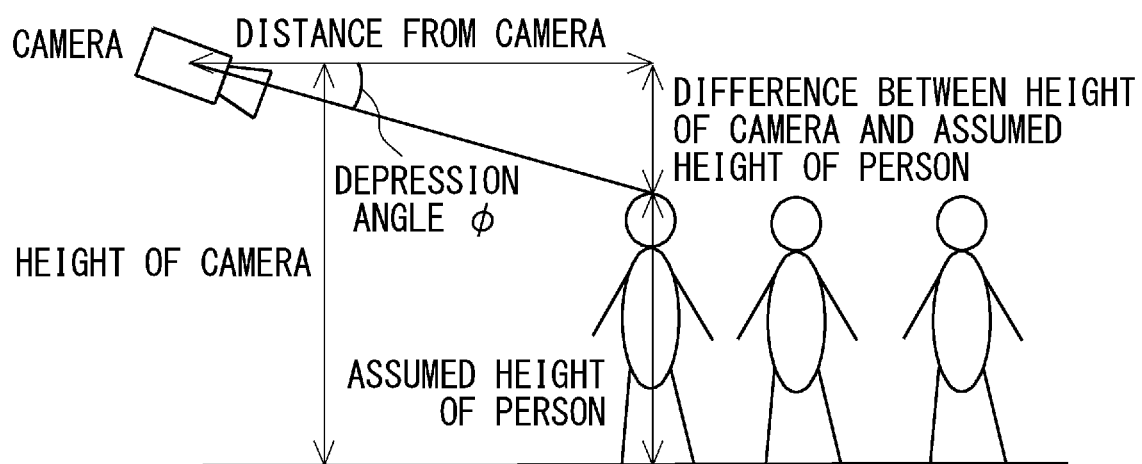
FIG. 4 is a side view of the camera layouts (A) and (B) of FIG. 2A.

FIGS. 3A and 3B show a relation between the position of the camera 110 and the queue position. FIG. 3A is a top view of a positional relation between a queue line with the camera layout (A) of FIG. 2A (a line indicating a direction in which the queue extends, corresponding to the above-mentioned staying line, because it is also a line along which the staying persons line up) and the camera 110. When the position of the camera is (Xcam, Ycam), and the position of the head of the queue determined by the position of the cash register counter is (Xa, Ya), the position and pose determination unit 103 can obtain a distance between the camera 110 and the head of the queue from a difference between these coordinates. Moreover, since the position and pose determination unit 103 can know the queue line from the structural object information, it can obtain an angle between the queue line and a line connecting the camera to the first person in the queue (the angle is hereinafter referred to as a relative azimuth angle with respect to the line in which the persons line up or simply referred to as a relative azimuth angle). With the camera layout (A), the relative azimuth angle becomes zero in the view seen from above. The way in which the persons overlap with each other in the horizontal direction of the video changes according to the relative azimuth angle, and thus the hiding level also changes. On the other hand, as shown in FIG. 4, the camera 110 is placed on the upper side (usually the ceiling), and a depression angle $\varphi$ with respect to the first person in the queue is acquired by a difference between the height of the camera 110 and an assumed height of the person and a distance from the camera 110 to the head of the queue. The way in which the persons overlap with each other in the vertical direction of the video changes according to the depression angle, and thus the hiding level also changes. Thus, the position and pose determination unit 103 can calculate the spatial hiding level of the persons lining up in the queue by obtaining both the depression angle and the relative azimuth angle.

Likewise, FIG. 3B shows a top view of a positional relation between the queue line and the camera 110 with the camera layout (B) of FIG. 2A. The relative azimuth angle is $\theta$ with the camera layout (B). Thus, the position and pose determination unit 103 can calculate the spatial hiding level of the persons lining up in the queue by obtaining the relative azimuth angle $\theta$ and the depression angle $\varphi$.

For example, when a distance between the persons is approximated by d, and a size of the person is approximated by a cylinder having a width W and a height H, the position and pose determination unit 103 can approximate a ratio r (D, $\theta$, $\varphi$) of the spatial hiding by the following formula (1), where the distance from the camera 110 to the person is D, the depression angle is $\varphi$, and the relative azimuth angle is $\theta$.

[Formula 1]

$$r(D, \theta, \varphi) = \min\left(1, \max\left(0, 1 + \frac{d\cos\theta}{2D} - \frac{d\sin\theta}{W}\right)\right)\max\left(0, 1 - \frac{d\cos\theta\tan\varphi}{H}\right) \quad (1)$$

The environment object dependent object dependent staying characteristic information storage unit 102 stores, as the environmental object dependent object staying characteristic information, information about d, W, and H and information about a position and an orientation of the queue line (the staying line) with respect to the cash register counter which represent the staying characteristic. The position and pose determination unit 103 calculates the spatial hiding level by Formula (1). Alternatively, the spatial hiding level for each of D, θ, and φ may be calculated in advance, and this spatial hiding level may be stored in the environmental object dependent object staying characteristic information storage unit 102. When the environmental object information includes a structural object such as a cash register counter at which a queue can be formed, the position and pose determination unit 103 obtains D, θ, and φ from the environmental object information and the camera layout, and reads the corresponding spatial hiding level from the environmental object dependent object staying characteristic information storage unit 102.

In reality, there are variations to some extent in values of the distance d between the persons, and the sizes W and H of the persons. There are also variations in the positions where the persons stand. Thus, the position and pose determination unit 103 may treat the spatial hiding level as a distribution p (r (D, θ, φ)) instead of treating it as one value determined by D, θ, and φ. The distribution is calculated by repeatedly calculating the spatial hiding level by varying the values of the distance d between the persons, the sizes W and H of the persons, and the positions where the persons stand within a certain range, and obtaining a frequency distribution. Then, representative values (mean, mode, median, etc.) of the distribution p (r (D, θ, φ)) may be calculated and stored in the environmental object dependent object staying characteristic information storage unit 102 to be used by the position and pose determination unit 103.

With the camera layout example of FIG. 2A, the spatial hiding level is lower with the camera layout (B) than it is with the camera layout (A). Thus, in this case, the camera layout (B) is selected by the position and pose determination unit 103. The position and pose determination unit 103 generates a plurality of such camera layout candidates and selects a camera layout in which the spatial hiding level becomes the lowest. Alternatively, the position and pose determination unit 103 may obtain a plurality of camera layouts in which the spatial hiding level becomes less than or equal to a predetermined threshold, and select the optimal one among the plurality of camera layouts using other indices. Other indices may be shielding by other obstacles, a resolution or an angle of the object, or a coverage ratio indicating how much the camera 110 can cover a range. For example, the method disclosed in Patent Literature 2 can be used as a method of selecting the optimal camera layout.

The spatial hiding level has been obtained as one value so far. However, in reality, the spatial hiding level varies from place to place. For example, in the example of the above queue, the distance and angle from the camera to the head of the queue differs from those of the end of the queue, and thus the value of the spatial hiding level also changes. For this reason, the position and pose determination unit 103 may calculate the spatial hiding level for each position (X, Y) of the monitored area and may select the camera layout based on the representative value (e.g., the mean).

In the specific example 1, the temporal hiding level has not been considered. This is because in the specific example 1, the influence of the temporal hiding level is the same regardless of the camera layout (e.g., the temporal hiding level stays the same, because the camera layouts (A) and (B) see the same queue). An example in which the temporal hiding level is considered will be described later.

In the specific example 1, an example in which the structural object is the cash register has been described. However, the structural object may be any structural object as long as it is a structural object in which a queue can be formed (or a queue is induced). For example, the specific example 1 can be applied to, for example, a queue in front of an ATM (Automatic Teller Machine), a queue in front of an immigration counter at an airport, and a queue in front of a ticket machine of a station in a manner similar to the example described above.

(Specific Example 2) When a Plurality of Queues are Formed at a Cash Register which is the Structural Object of the Environmental Object Next, a case in which the structural object of the environmental object is a cash register counter, and a plurality of queues are formed in front of the cash register counter will be described.

Figure 5A:
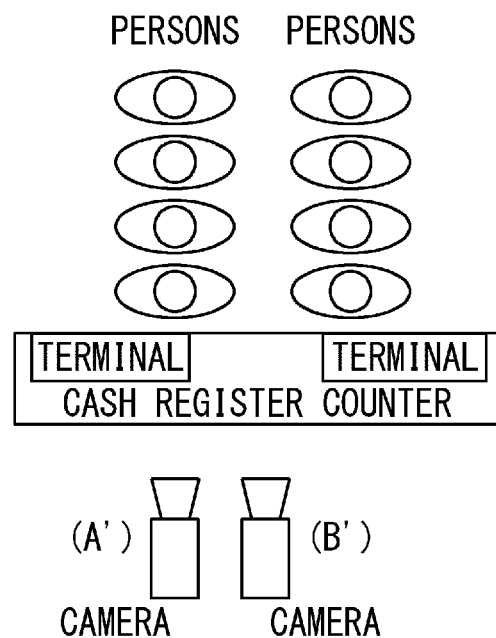
FIG. 5A is a view showing a camera layout example of cameras for capturing persons lining up at a cash register counter where a plurality of queues are formed.
Figure 5B:
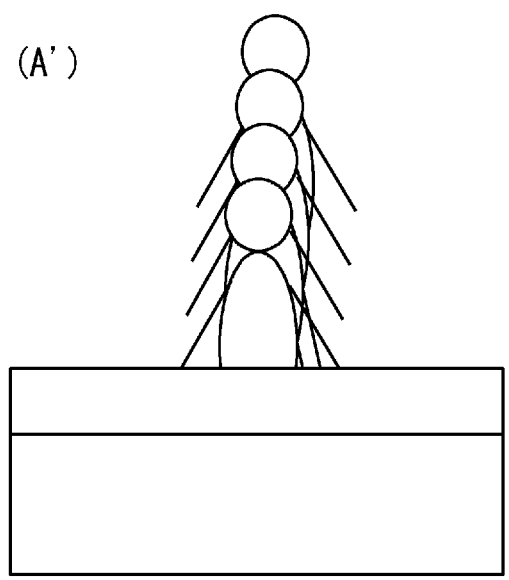
FIG. 5B is a view showing an example of a video assumed when the video is captured with a camera layout (A') of FIG. 5A.
Figure 5C:
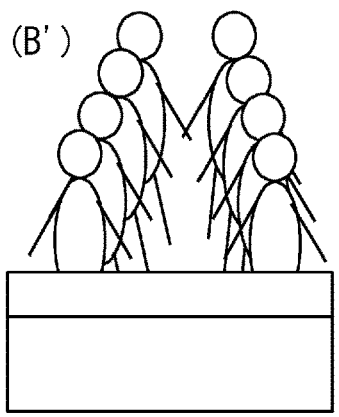
FIG. 5C is a view showing an example of a video assumed when the video is captured with a camera layout (B') of FIG. 5A.

FIG. 5A shows a camera layout example of the camera 110 for capturing persons lining up at a cash register counter where a plurality of queues are formed, and is a view seen from directly above. Also in this FIG. 5A, two types of camera layouts (A') and (B') are shown. The camera layout (A') shows a camera layout for capturing persons lining up in front of one cash register counter from the front the cash register counter, and the camera layout (B') shows a camera layout in which two queues are viewed diagonally in the middle of the two queues. FIG. 5B is an example of a video of persons assumed to be captured with the camera layout (A'), and FIG. 5C is an example of a video of persons assumed to be captured with the camera layout (B'). In the camera layout examples of FIG. 5A, as described in the specific example 1, the spatial hiding level is smaller with the camera layout (B') than with the camera layout (A'). Further, with the camera layout (A'), another camera 110 is required in front of the queue in order to see the other queue. On the other hand, with the camera layout (B'), one camera 110 can cover two queues, and thus it can be said that the camera layout (B') is more preferable than the camera layout (A') in terms of the number of cameras 110.

Thus, the position and pose determination unit 103 selects the camera layout (B'). However, when the distance between the queues is narrow, or when the depression angle of the camera 110 is small due to limitations such as the height of the ceiling, the spatial hiding level may not be sufficiently lowered in some cases. In such a case, the spatial hiding level can be lowered by employing the camera layout described in the specific example 1 for each queue.

(Specific Example 3) When a Plurality of Queues are Formed at a Cash Register Counter which is the Structural Object of the Environmental Object, and there is a Difference in Speeds at which the Queues Move Next, a case where the structural object of the environmental object is a cash register counter, a plurality of queues are formed in front of the cash register counter, and there is a difference in the speeds at which the queues move will be described.

Figure 6A:
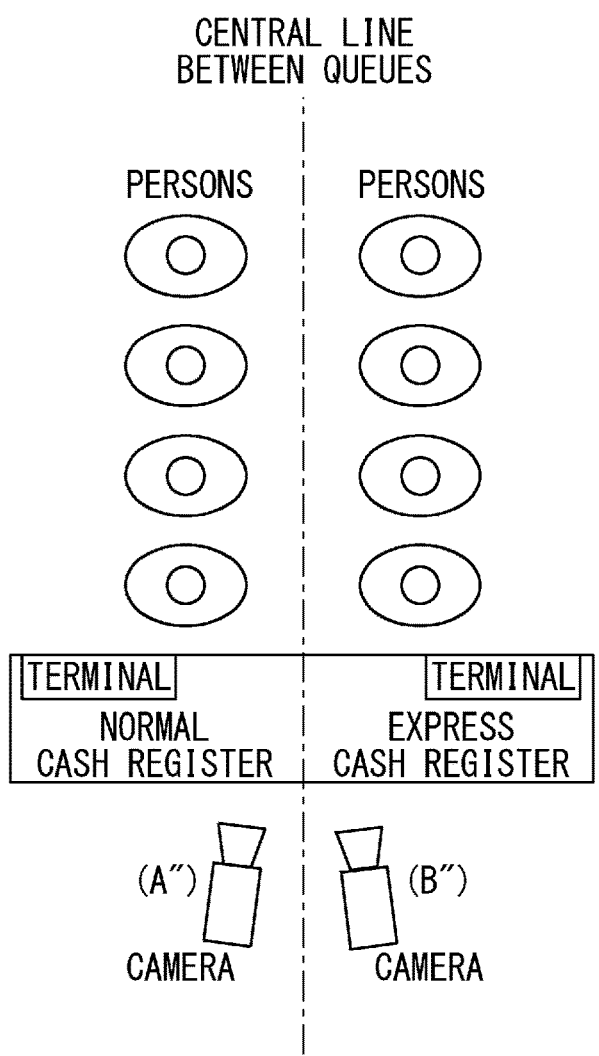
FIG. 6A is a view showing a camera layout example of cameras for capturing persons lining up at a cash register counter where a plurality of queues are formed.

FIG. 6A shows a camera layout example of the camera 110 for capturing persons lining up at a cash register counter where a plurality of queues are formed, and is a view seen from directly above. A difference between FIG. 6A and FIG. 5A is that in FIG. 6A, the left side is a normal cash register, and the right side is an express cash register (e.g., a self-checkout where a store clerk only checks items, and a customer pays money with a self-payment machine). The speed at which the right queue moves is faster than that of the left queue, and thus there is a difference in the speeds at which the queues move. Also in this FIG. 6, two types of camera layouts (A") and (B") are shown. The camera layout (A") shows a camera layout in which the camera 110 is installed closer to the normal cash register side with respect to a center line between the queues to capture both queues. Conversely, the camera layout (B") shows a camera layout in which the camera 110 is installed closer to the express cash register side with respect to the center line between the queues to capture both queues. Considering only the spatial hiding level of the camera layout example of FIG. 6A, when a shift of the camera 110 from the center line between the queues is the same for the camera layouts (A") and (B"), the hiding levels become the same. However, the speed at which the queue for the normal cash register moves is slower than the speed at which the queue for the express cash register moves, and thus a period of time during which a hiding state continues is longer for the normal cash register than the express cash register. Thus, when the total hiding level in consideration of the temporal hiding level is calculated, the camera layout (B") is preferable to the camera layout (A"), because the total hiding level becomes lower with the camera layout (B") than with the camera layout (A"). In the following descriptions, a method of calculating the temporal hiding level and a method of calculating the total hiding level based on the temporal hiding level will be described.

Figure 7:
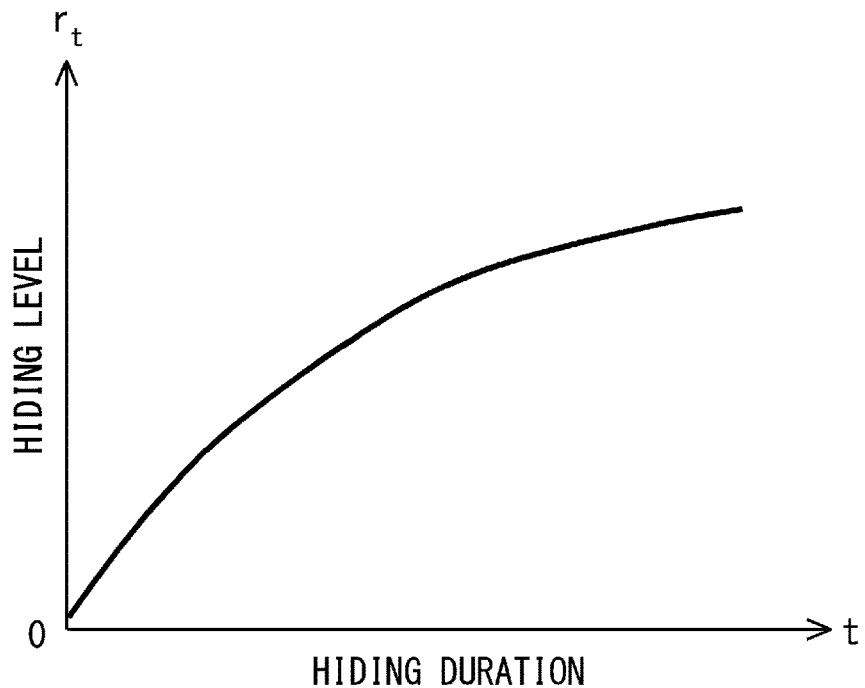
FIG. 7 is a graph showing an example of a relation between a hiding duration and a temporal hiding level.

The position and pose determination unit 103 can define the temporal hiding level by the duration of hiding (the period of time during which the hiding state continues). That is, the position and pose determination unit 103 regards that the longer the duration of hiding, the greater the temporal hiding level becomes. For example, as shown in FIG. 7, the position and pose determination unit 103 can numerically express the temporal hiding level as a monotone non-decreasing function $r_t(t)$ of the duration of the hiding t which satisfies the formula (2).

[Formula 2]

$$0 \le r_t(t) \le 1, r_t(0)=0, r_t(t_0) \le r_t(t_1) (0 \le t_0 \le t_1) \quad (2)$$

In a queue, when the first person checks out and the next person moves forward, the entire queue moves forward. The hiding state is temporarily resolved at this timing, and thus the hiding duration can be considered as a period of time during which a stationary state of the queue continues. Therefore, the position and pose determination unit 103 may obtain the distribution of the time when the queue is in a stationary state, and use the representative value as the hiding duration. The position and pose determination unit 103 can calculate the temporal hiding level by $r_t(t)$ using this hiding duration.

Figure 6B:
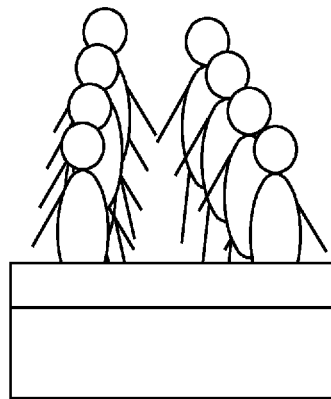
FIG. 6B is a view showing an example of a video assumed when the video is captured with a camera layout (A") of FIG. 6A.
Figure 6C:
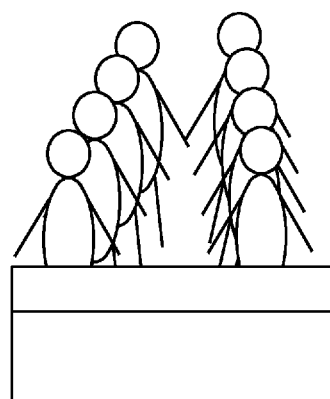
FIG. 6C is a view showing an example of a video assumed when the video is captured with a camera layout (B") of FIG. 6A.

The position and pose determination unit 103 can define the total hiding level as a value obtained by integrating the spatial hiding level with the temporal hiding level, and for example, the value obtained by multiplying the hiding level by the temporal hiding level may be used as the total hiding level. Assume that the hiding durations of the left and right queues in FIG. 6A are $T_1$ and $T_2$ ($T_1 > T_2$), respectively, and the spatial hiding levels of the left and right queues in FIG. 6B are $R_1$ and $R_2$, respectively (where $R_1 > R_2$).

In this case, the position and pose determination unit 103 can calculate the total hiding level for the camera layout (A") by averaging the two queues as shown in Formula (3).

[Formula 3]

$$\frac{1}{2}\{R_1 r_t(T_1) + R_2 r_t(T_2)\} \quad (3)$$

On the other hand, the position and pose determination unit 103 can calculate the total hiding level for the camera layout (B") as shown in Formula (4).

[Formula 4]

$$\frac{1}{2}\{R_2 r_t(T_1) + R_1 r_t(T_2)\} \quad (4)$$

Since $T_1 > T_2$ currently holds, $r_t(T_1) > r_t(T_2)$ holds, and the total hiding level of Formula (3) is greater than the total hiding level of Formula (4).

Therefore, in the camera layout example of FIG. 6A, the position and pose determination unit 103 selects the camera layout (B"). However, when the distance between the queues is narrow, or when the depression angle of the camera is small due to limitations such as the height of the ceiling, the spatial hiding level may not be sufficiently lowered in some cases. In this case, the position and pose determination unit 103 may make the same selection as in the specific example 2.

In this way, when there is a difference in the speed at which the queues move, it can be seen that it is better to position the camera 110 closer to the queue which moves faster than the other queue with respect to the center line between the queues. In the above descriptions, the total hiding level is calculated using the staying duration, and then the camera layout is selected. However, if only the speed at which the queue moves is known for each type of the cash register as the staying characteristic, it is possible to know which queue side the camera 110 should be positioned closer to. Thus, the environmental object dependent object staying characteristic information storage unit 102 may store velocity information of the queue as the environment dependent object staying characteristic information, and the position and pose determination unit 103 may determine which queue side the camera 110 should be positioned closer to only from the velocity information of the queues. Alternatively, an amount of shifting the camera 110 from the center line between the queues may be calculated in advance based on the speed difference between the queues, and a result of the calculation may be included in the environment dependent object staying characteristic information to be stored in the environmental object dependent object staying characteristic information storage unit 102. Then, when it is found that there is a speed difference between adjacent queues from the environmental object information, the position and pose determination unit 103 may read information about the amount of shifting the camera 110 according to the speed difference from the environmental object dependent object staying characteristic information storage unit 102 and determine the video acquisition unit layout information.

Figure 8A:
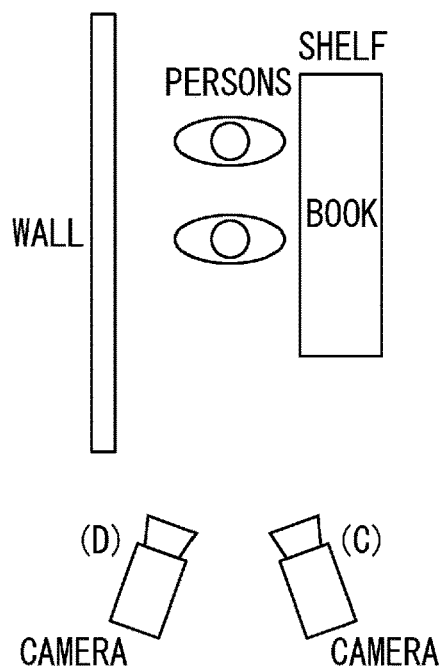
FIG. 8A is a view showing a camera layout example of cameras for capturing persons in a passage in which one side thereof is a wall and a shelf is placed on the other side thereof.
Figure 8B:
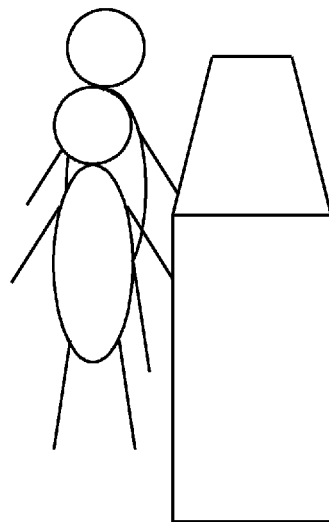
FIG. 8B is a view showing an example of a video assumed when the video is captured with a camera layout (C) of FIG. 8A.
Figure 8C:
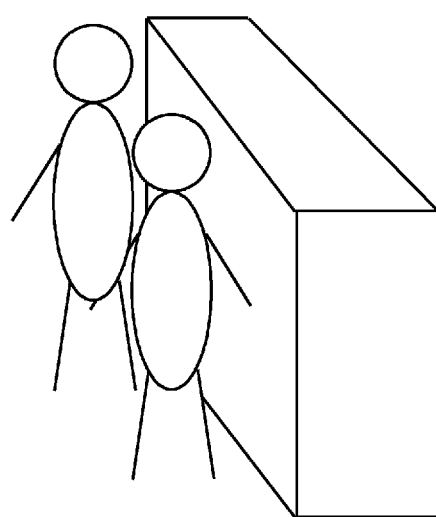
FIG. 8C is a view showing an example of a video assumed when the video is captured with a camera layout (D) of FIG. 8A.

(Specific Example 4) When the Structural Objects of the Environmental Object are a Wall and a Fixture (Shelf) and the Placed Objects are Items FIG. 8A shows a camera layout example of the camera 110 for capturing persons in the vicinity of a commodity shelf, and is a view seen from directly above. Here, in addition to a shelf as the structural object, items (in this case, books) which are placed objects placed on the structural object are also presented. On the other hand, the other side of the shelf across the passage is a wall. Also in this FIG. 8A, two types of camera layouts (C) and (D) are shown. The camera layout (C) shows a camera layout for capturing a video from a position closer to the shelf where the books are placed, and the camera layout (D) is a camera layout for capturing a video from a position closer to the wall. FIG. 8B is an example of a video of persons assumed to be captured with the camera layout (C), and FIG. 8C is an example of a video of persons assumed to be captured with the camera layout (D). FIGS. 8B and 8C show how the situation where two persons staying side by side in front of the shelf where the books are placed is captured. Considering that shoppers are likely to stay in front of book shelves, the situation of staying in this way is likely to occur. Therefore, in the example of the camera layout of FIG. 8A, it can be said that the camera layout (D) is preferable to the camera layout (C), because the spatial hiding level of the camera layout (D) can be made smaller than that of the camera layout (C). In the following descriptions, a method of calculating the spatial hiding level in each case of the camera layout (C) and (D) will be described.

First, the position and pose determination unit 103 generates two camera layouts (C) and (D) as candidates for the camera layout of the camera 110 (the position and pose of the camera 110). The position and pose determination unit 103 determines, from the camera layouts (C) and (D) and the environmental object information, a positional relation between the structural object in the monitored area and placed objects (in this case, the shelf and the items) and the camera 110 in the monitored area as shown in FIG. 8A. Then, the position and pose determination unit 103 can determine a position where persons are likely to stay, and like in the specific example 1, determine the positional relation between this position and the camera 110 (a distance from the camera 110 to the staying person or an angle of the camera 110 with respect to a direction in which the staying person lines up). Thus, like in the specific example 1, the position and pose determination unit 103 can obtain the relative azimuth angle and the depression angle with respect to the direction in which the staying person lines up.

Next, the position and pose determination unit 103 obtains the spatial hiding level for the depression angle and the relative azimuth angle obtained as above from the environmental object dependent object staying characteristic information. At this time, like in the specific example 1, the environmental object dependent object staying characteristic information includes a parameter such as a distance between persons which is necessary for obtaining the spatial hiding level. The position and pose determination unit 103 calculates the spatial hiding level using this parameter. This spatial hiding level can be calculated in the same manner as in the specific example 1, although the value of the parameter such as the distance between persons differ from that for the queue in the specific example 1. Alternatively, as in the specific example 1, the information about the hiding level calculated for each of the distance to the staying position, the depression angle of the camera, and the relative azimuth angle may be stored in advance in the environmental object dependent object staying characteristic information storage unit 102 as the environmental object dependent object staying characteristic information. The characteristic of this hiding level varies depending on the type of items placed on the shelf. For this reason, the hiding level is obtained for each placed object placed on the shelf and stored, and the position and pose determination unit 103 uses the corresponding hiding level information according to the information of the placed object included in the input environmental object information. The staying duration varies depending on the placed object on the shelf. A case where this varying staying duration is considered will be described later.

In the camera layout example shown in FIG. 8, the position and pose determination unit 103 selects the camera layout (D), because the value of the spatial hiding level of the camera layout (D) is smaller than that of the camera layout (C). Like in the specific example 1, in the specific example 4, the position and pose determination unit 103 generates a plurality of camera layouts, and determines the camera layout based on the calculated value of the spatial hiding level for each of the camera layouts.

Figure 9A:
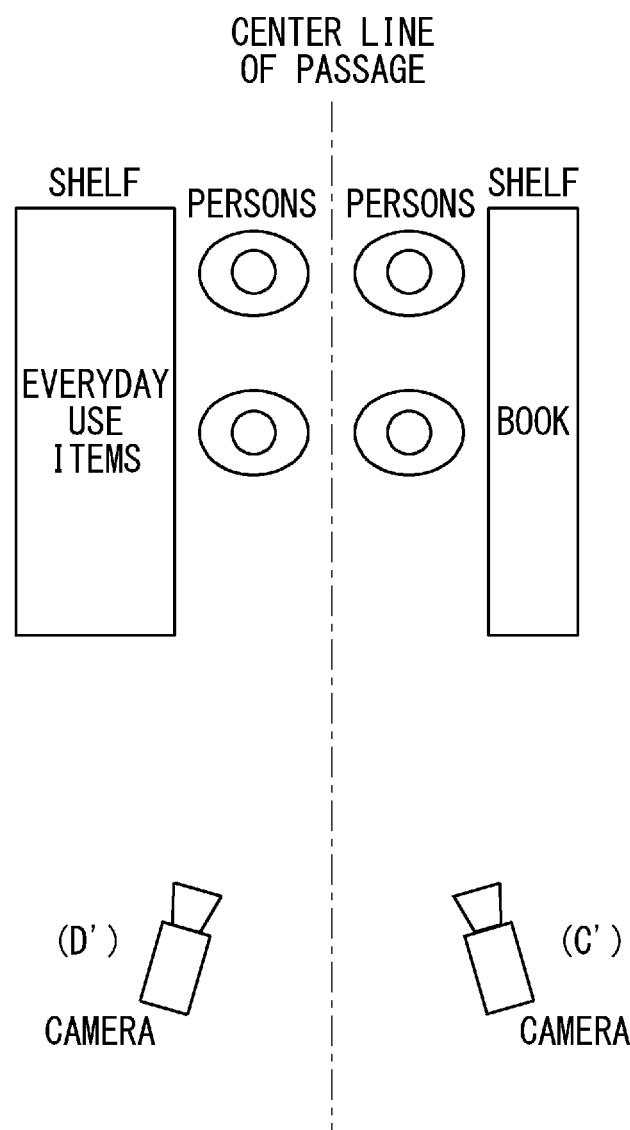
FIG. 9A is a view showing a camera layout example of cameras for capturing persons in a passage in which shelves are placed on both sides thereof.
Figure 9B:
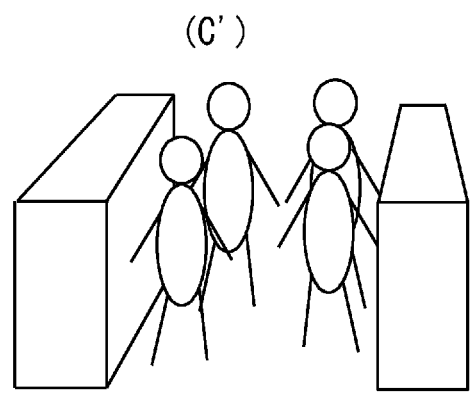
FIG. 9B is a view showing an example of a video assumed when the video is captured with a camera layout (C') of FIG. 9A.
Figure 9C:
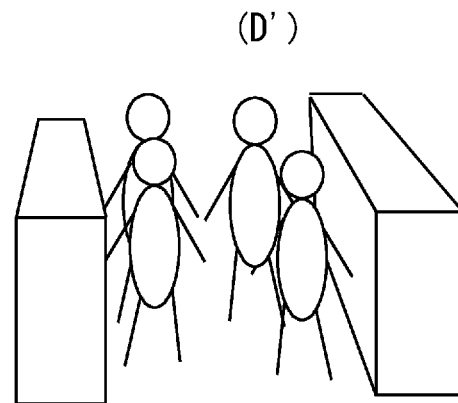
FIG. 9C is a view showing an example of a video assumed when the video is captured with a camera layout (D') of FIG. 9A.

(Specific Example 5) When the Structural Object of the Environmental Object is a Fixture (Shelf) and the Placed Objects are Items FIG. 9A shows a camera layout example of the camera 110 for capturing persons in the vicinity of a commodity shelf, and is a view seen from directly above. Here, in addition to a shelf as a structural object, items (in this case, book and everyday use items) which are placed objects placed on the structural object are also presented. Also in this FIG. 9A, two types of camera layouts (C') and (D') are shown. The camera layout (C') shows a camera layout for capturing a video from a position closer to the shelf where the books are placed, and the camera layout (D') is a camera layout for capturing a video from a position closer to a shelf where everyday use items are arrange. FIG. 9B is an example of a video of persons assumed to be captured with the camera layout (C'), and FIG. 9C is an example of a video of persons assumed to be captured with the camera layout (D'). FIGS. 9B and 9C show how the situation where two persons staying side by side in front of the shelf where the books are placed and the shelf where the everyday use items are placed is captured. The spatial hiding level is the same between the camera layouts (C') and (D') in the videos shown in FIGS. 9B and 9C. However, a person tends to stay for a longer time in front of a book shelf than in front of an everyday use item shelf, and thus a period of time during which the hiding state continues is longer for the book shelf than the everyday item shelf. Thus, considering the temporal hiding level, it can be said that the camera layout (D') is preferable. In the following descriptions, a method of calculating the temporal hiding level and a method of calculating the total hiding level using the temporal hiding level will be described in each case of the camera layout (C') and (D').

Basically, the calculation of the temporal hiding level is the same as in the case of the specific example 3. That is, the position and pose determination unit 103 can obtain the temporal hiding level as a function of the hiding duration. However, the method of obtaining the hiding duration differs from that for the queue. In the case of staying, the hiding duration varies depending on an occurrence frequency of staying and a staying time per stay. For example, assuming that the staying state occurs uniformly, that the number of occurrences of staying per unit time is N, and that the staying duration per staying is T, an average hiding duration can be approximated by Formula (5).

[Formula 5]
$$\max\left(0, T - \frac{1}{N}\right) \quad (5)$$

Here, 1/N can be regarded as a time interval in which the staying occurs. In reality, the occurrence of the staying may not follow a uniform distribution. Moreover, the staying time is not a constant value and instead it usually has some distribution. Thus, the position and pose determination unit 103 may calculate the hiding duration in consideration of such factors. Specifically, the position and pose determination unit 103 may actually measure distributions of occurrence time intervals between the staying and staying times, and calculate hiding duration by simulation based on the measured distribution. That is, the position and pose determination unit 103 may generate a staying situation that follows the actually measured distribution and obtain the time during which the hiding state continues. The hiding duration acquired in this manner changes depending on the placed object. Thus, the hiding duration may be obtained for each placed object, and the hiding duration for each placed object may be stored in the environmental object dependent object staying characteristic information storage unit 102 as the environment dependent object staying characteristic information.

Then, like in the specific example 3, the position and pose determination unit 103 can calculate total hiding level information by multiplying the temporal hiding level by the spatial hiding level thus obtained. The position and pose determination unit 103 determines the camera layout based on the total hiding level information obtained as above. In the camera layout example of FIG. 9A, the camera layout (D') is selected for the same reason as in the specific example 3. In this way, in the case of a passage that is sandwiched between shelves having staying levels different from each other such as the shelves having staying durations different from each other, it is preferable to install the camera 110 closer to the shelf where there is less staying with respect to the center, because the hiding level as a whole can be made lower. That is, the position and pose determination unit 103 may be at least installed in a camera layout in which the camera 110 is placed closer to the shelf where persons are less likely to stay than the other shelf with respect to the center of the passage, and a camera layout in which the hiding level is small among these camera layouts may be selected.

In the above descriptions, the total hiding level is calculated using the staying duration and the staying frequency to select the camera layout. However, if only the hiding duration determined by the staying duration and the staying frequency is known for each placed object placed on the shelf as the staying characteristic, it is possible to know which shelf should the camera 110 be placed closer to. Thus, the hiding duration information about the placed object on the shelf may be stored in the environmental object dependent object staying characteristic information storage unit 102 as the environment dependent object staying characteristic information, and the position and pose determination unit 103 may directly determine which shelf side the camera should be positioned closer to only from this information. Alternatively, the temporal hiding level itself acquired by the hiding duration may be included in the environment dependent object staying characteristic information as an index (staying degree) indicating likeliness of an occurrence of the staying. The amount of shifting the camera 110 from the center line of the passage may be calculated in advance, and a result of the calculation may be included in the environment dependent object staying characteristic information. When it is found from the environmental object information that there is a difference between the staying level of one side of the passage and that of the other side of the passage, the position and pose determination unit 103 may read information about the amount of shifting the camera 110 from the environmental object dependent object staying characteristic information storage unit 102 according to the difference in the staying levels to determine the camera layout information.

As described above, in the first embodiment, the video monitoring apparatus 100 determines the position and the pose of the video acquisition unit 110 in such a way that the hiding level caused by overlapping of objects becomes low based on environmental object information indicating an environmental object including a structural object present in the monitored area and a placed object placed in the structural object and staying characteristic information indicating a staying characteristic of the object determined depending on the environmental object.

As described above, according to the first embodiment, the video monitoring apparatus 100 considers not only the information about the static environmental object in the monitoring area but also the staying characteristic of the object determined depending on the environmental object to determine the position and pose of the video acquisition unit. For this reason, even under the situation where objects overlap with each other due to the staying of the objects determined depending on the environmental object, and the objects are hidden, it is possible to perform appropriate video monitoring. As more appropriate video monitoring can be made possible, it is possible to more appropriately monitor the monitored object and perform object detection/tracking processing, thereby providing a more appropriate analysis result.

Second Embodiment

Figure 10:
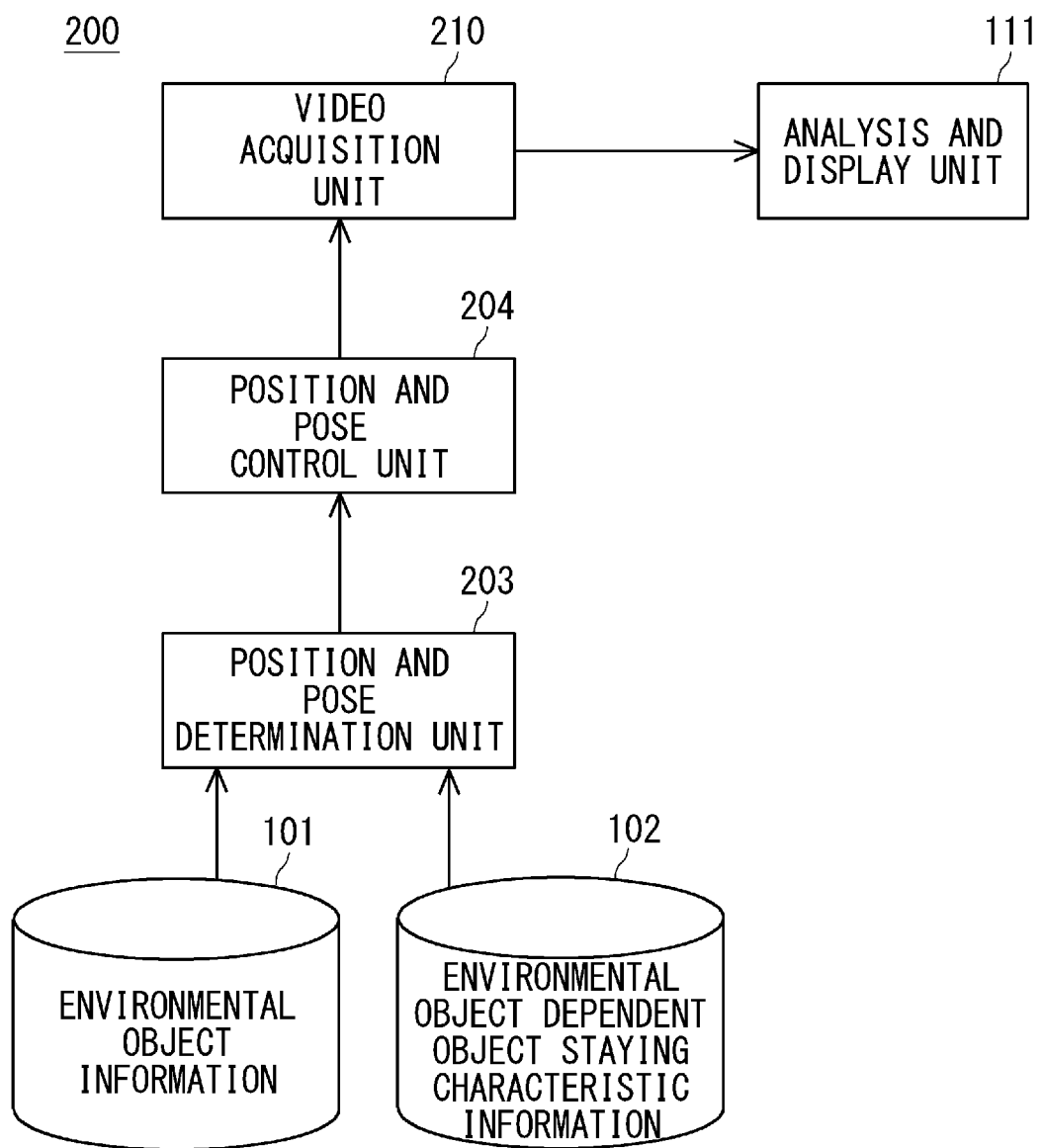
FIG. 10 is a block diagram showing a configuration example of a video monitoring apparatus 200 according to a second embodiment of the present disclosure.

Referring to FIG. 10, a configuration example of a video monitoring apparatus 200 according to a second embodiment of the present disclosure is shown. The video monitoring apparatus 200 includes a video acquisition unit 210, an analysis and display unit 111, an environmental object information storage unit 101, an environmental object dependent object staying characteristic information storage unit 102, a position and pose determination unit 203, and a position and pose control unit 204.

The position and pose determination unit 203 generates video acquisition unit layout information based on environmental object information of a monitoring area stored in the environmental object information storage unit 101 and environment object dependent object staying characteristic information stored in the environmental object dependent object staying characteristic information storage unit 102, and outputs the generated video acquisition unit layout information to the position and pose control unit 204.

The position and pose control unit 204 generates position and pose control information based on the video acquisition unit layout information output from the position and pose determination unit 203, and outputs it to the video acquisition unit 210.

The video acquisition unit 210 can change the position and pose by external control. The video acquisition unit 210 changes the position and pose according to the position and pose control information output from the position and pose control unit 204, and outputs the captured video to the analysis and display unit 111.

Next, an operation of the video monitoring apparatus 200 shown in FIG. 10 will be described.

Operations of the environmental object information storage unit 101 and the environmental object dependent object staying characteristic information storage unit 102 are the same as those of the video monitoring apparatus 100 of FIG. 1. However, the environmental object information may be set for each time. For example, if the number of counters in front of the cash register or the number of counters at an airport which open is determined in advance according to time of day, the information about the counter which opens for each time of day may be included in the structural object information, and the position and pose determination unit 203 may obtain the layout of the video acquisition unit 210 for time of day using the information about the counter and outputs the video acquisition unit layout information. The video acquisition unit layout information generated by the position and pose determination unit 203 is input to the position and pose control unit 204.

The position and pose control unit 204 generates the position and pose control information for controlling the video acquisition unit 210 based on the video acquisition unit layout information input from the position and pose determination unit 203. The position and pose control information generated by the position and pose control unit 204 is output to the video acquisition unit 210.

The video acquisition unit 210 can change the position and pose by external control. For example, the video acquisition unit 210 may be a device that can float in the air and capture a video like a UAV (Unmanned Aerial Vehicle). Alternatively, the video acquisition unit 210 may be a camera placed on a wall or a ceiling, and may be a camera which can move on an installed rail. Further alternatively, the video acquisition unit 210 may be a camera mounted on a robot which can move. The video acquisition unit 210 changes the position and pose according to the position and pose control information input from the position and pose control unit 204, and captures a video. Then, the video acquisition unit 210 outputs the captured video to the analysis and display unit 111.

The operation of the analysis and display unit 111 is the same as that of the video monitoring apparatus 100 of FIG. 1.

As described above, according to the second embodiment, the video monitoring apparatus 200 sets the environmental object information for each time of day. Therefore, the video monitoring apparatus 200 can appropriately change the position and pose of the video acquisition unit 210 according to the situation of the structural object which changes according to the time of day, thereby making it possible to provide a more appropriate monitoring videos and analysis results.

Third Embodiment

Figure 11:
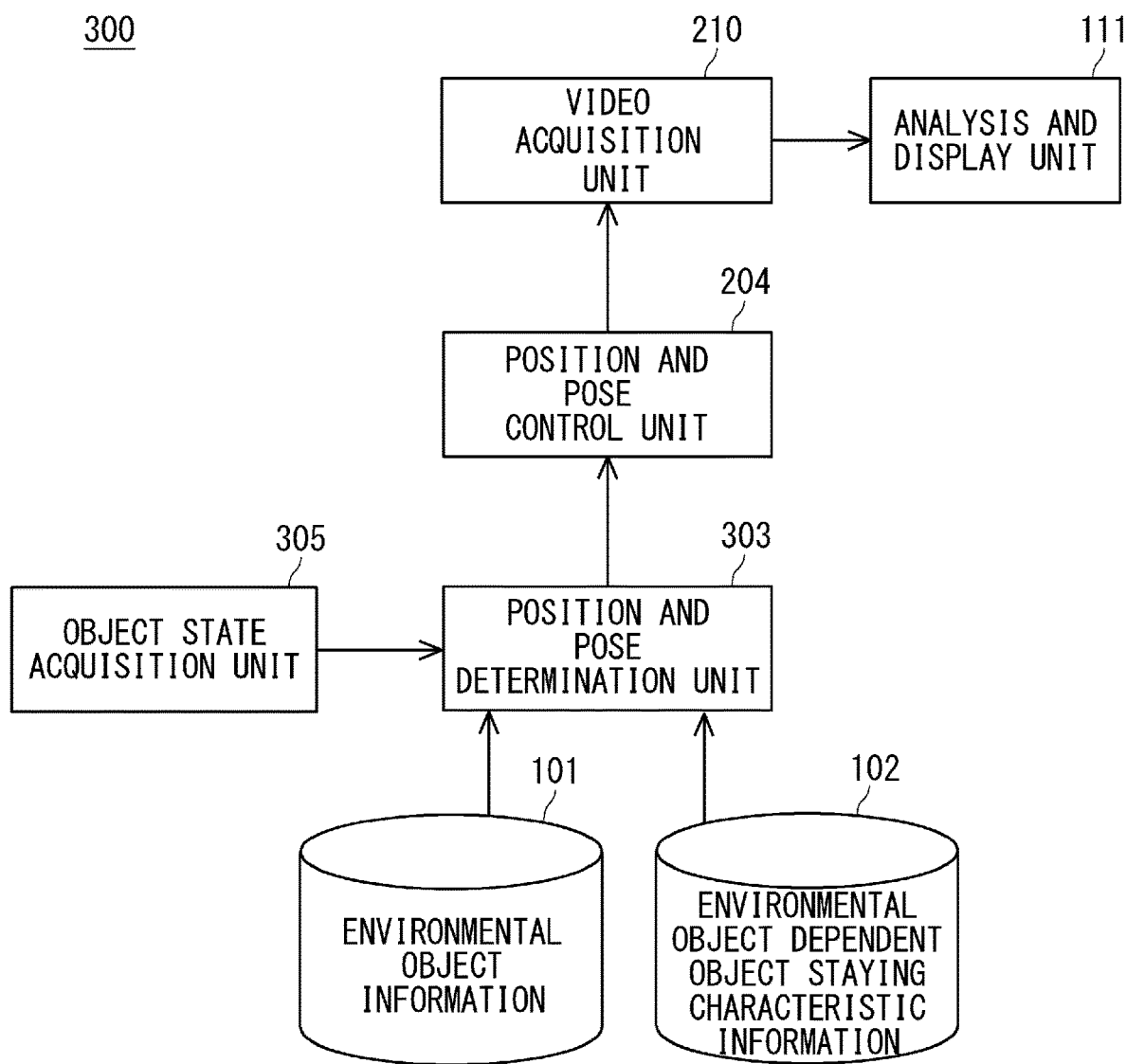
FIG. 11 is a block diagram showing a configuration example of a video monitoring apparatus 300 according to a third embodiment of the present disclosure.

Referring to FIG. 11, a configuration example of a video monitoring apparatus 300 according to a third embodiment of the present disclosure is shown. The video monitoring apparatus 300 includes a video acquisition unit 210, an analysis and display unit 111, an environmental object information storage unit 101, an environmental object dependent object staying characteristic information storage unit 102, a position and pose determination unit 303, a position and pose control unit 204, and an object state acquisition unit 305.

The object state acquisition unit 305 acquires a state of an object to be monitored and outputs object state information indicating the state of the object to the position and pose determination unit 303.

The position and pose determination unit 303 generates the above video acquisition unit layout information based on the environmental object information of the monitoring area stored in the environmental object information storage unit 101, environmental object dependent object staying characteristic information stored in the environmental object dependent object staying characteristic information storage unit 102, and the object state information output from the object state acquisition unit 305, and outputs the generated video acquisition unit layout information to the position and pose control unit 204.

The other configurations of the video monitoring apparatus 200 are the same as those of the video monitoring apparatus 200 shown in FIG. 10.

Next, an operation of the video monitoring apparatus 300 shown in FIG. 11 will be described.

The object state acquisition unit 305 is means for observing a state of an object in the monitored area, and observes the state of the object such as the number and movements of the object, and a structure (e.g., a queue) formed by the object. Specifically, the object state acquisition unit 305 may be a sensor installed at a fixed position of the monitored area or an imaging device which acquires a video. The sensor may be a sensor (a human detection sensor if the object is a person) which detects an object, or a sensor which catches signals such as RFID (Radio Frequency IDentification), WiFi (Wireless Fidelity), BlueTooth (registered trademark) to estimate whether an object is present and the number of objects near the sensor. Alternatively, the sensor may be a device which collects acoustic information such as a microphone and analyzes the collected acoustic information to know the state of the object. When the object state acquisition unit 305 is a device which acquires a video, the device may analyze the object in the video and know the number of objects and the state of the object. Alternatively, the video acquisition unit 210 itself may play a role of the device. Various known methods may be used as a method of analyzing the object and knowing the state of the object. The object state information acquired by the object state acquisition unit 305 is input to the position and pose determination unit 303.

Among the operations of the position and pose determination unit 303, an operation when the object state information is not input from the object state acquisition unit 305 is the same as the operation of the position and pose determination unit 203 of FIG. 10. On the other hand, when the object state information is input from the object state acquisition unit 305, the position and pose determination unit 303 corrects the video acquisition unit layout information based on the object state information. For example, when the number of queues varies according to circumstances in an area where a plurality of queues can be formed, the position and pose determination unit 303 knows in advance positions at which the queues are formed based on the object state information to calculate a hiding level and generate the video acquisition unit layout information. Alternatively, the position and pose determination unit 303 may weight, according to reliability of the object state information, the hiding level obtained without the object state information and the hiding level obtained based on the object state information, obtain the hiding level by obtaining a weighted average, and then generates the video acquisition unit layout information. The video acquisition unit layout information generated by the position and pose determination unit 303 is output to the position and pose control unit 204.

The operations of the position and pose control unit 204, the video acquisition unit 210, and the analysis and display unit 111 are the same as those of the video monitoring apparatus 200 shown in FIG. 10.

As described above, according to the third embodiment, the video monitoring apparatus 300 acquires the state of the object and changes the position and pose of the video acquisition unit 210 based on the state of the object. By doing so, the video monitoring apparatus 300 can appropriately change the position and pose of the video acquisition unit 110 according to the state of the object which changes depending on the situation, thereby making it possible to provide more appropriate video monitoring and analysis result.

Further, each element shown in the drawings as functional blocks that perform various processing can be formed of a CPU (Central Processing Unit), a memory, and other circuits in hardware and may be implemented by programs loaded into the memory in software. Those skilled in the art will therefore understand that these functional blocks may be implemented in various ways by only hardware, only software, or the combination thereof without any limitation.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present disclosure has been described with reference to the embodiments, the present disclosure is not limited to these embodiments. Various changes that can be understood by those skilled in the art within the scope of the present disclosure can be made to the configurations and the details of the present disclosure.

The whole or part of the embodiments disclosed above can be described as, but not limited to, the following supplementary notes.

(Supplementary Note 1)

A video monitoring apparatus for monitoring inside a monitored area using a video acquisition unit, the video monitoring apparatus comprising:

a position and pose determination unit configured to determine a position and a pose of the video acquisition unit in such a way that a level of hiding caused by overlapping of objects becomes low based on environmental object information indicating an environmental object including a structural object present in the monitored area and a placed object placed in or on the structural object, and staying characteristic information indicating a staying characteristic of the object determined depending on the environmental object; and an analysis and display unit configured to perform at least one of analyzing a video captured by the video acquisition unit at the position and the pose determined by the position and pose determination unit and displaying the video.

(Supplementary Note 2)

The video monitoring apparatus according to Supplementary note 1, wherein the video acquisition unit can change the position and the pose by external control, the video monitoring apparatus further comprises a position and pose control unit configured to generate control information for controlling the video acquisition unit based on the position and the pose determined by the position and pose determination unit, and the video acquisition unit changes the position and the pose based on the control information generated by the position and pose control unit.

(Supplementary Note 3)

The video monitoring apparatus according to Supplementary note 1, further comprising an object state acquisition unit configured to acquire a state of the object, wherein the position and pose determination unit determines the position and the pose of the video acquisition unit also using the state of the object acquired by the object state acquisition unit.

(Supplementary Note 4)

The video monitoring apparatus according to any one of Supplementary notes 1 to 3, wherein the staying characteristic information includes at least one of information about a position and an orientation of a staying line that is a line along which a staying object lines up and is determined depending on the environmental object, and information about a staying duration of the staying object, and the position and pose determination unit calculates the level of hiding by calculating a spatial hiding level based on a relative azimuth angle and a distance between the staying line and the video acquisition unit, and a depression angle of the video acquisition unit, or by calculating a temporal hiding level based on the staying duration.

(Supplementary Note 5)

The video monitoring apparatus according to any one of Supplementary notes 1 to 3, wherein when the environmental object information includes information indicating a structural object which induces generation of a plurality of queues, and the staying characteristic information indicates the staying line along which the staying object lines up corresponding to each of the plurality of queues formed in front of the structural object, the position and pose determination unit determines to install the video acquisition unit between the staying lines.

(Supplementary Note 6)

The video monitoring apparatus according to any one of Supplementary notes 1 to 3, wherein when the environmental object information includes information indicating a structural object which induces generation of a plurality of queues, the staying characteristic information indicates the staying line along which the staying object lines up corresponding to each of the plurality of queues formed in front of the structural object, and speeds at which the queues move differ from each other, the position and pose determination unit determines to install the video acquisition unit closer to a side of the queue which moves faster than another queue with respect to a center between the queues.
(Supplementary Note 7)

The video monitoring apparatus according to any one of Supplementary notes 1 to 3, wherein when the environmental object information includes information indicating a passage and information indicating placed objects placed on the structural objects on both sides of the passage, and the staying characteristic information indicates that a staying level of the object differs from that of another object, the position and pose determination unit determines to install the video acquisition unit to a position closer to the side in which the staying level is smaller than that of the other side with respect to a center of the passage.
(Supplementary Note 8)

A method of controlling video monitoring apparatus for monitoring inside a monitored area using a video acquisition unit, the method comprising:
  determining a position and a pose of the video acquisition unit in such a way that a level of hiding caused by overlapping of objects becomes low based on environmental object information indicating an environmental object including a structural object present in the monitored area and a placed object placed in or on the structural object, and staying characteristic information indicating a staying characteristic of the object determined depending on the environmental object; and
  performing at least one of analyzing a video captured by the video acquisition unit at the determined position and the determined pose and displaying the video.
(Supplementary Note 9)

The method according to Supplementary note 8, wherein
  the video acquisition unit can change the position and the pose by external control,
  the method further comprises generating control information for controlling the video acquisition unit based on the position and the pose determined in the determination of the position and the pose, and
  the video acquisition unit changes the position and the pose based on the control information generated by the position and pose control unit.
(Supplementary Note 10)

The video monitoring apparatus according to Supplementary note 8, further comprising acquiring a state of the object, wherein
  in the determination of the position and the pose, the position and the pose of the video acquisition unit are determined also using the state of the object acquired by the object state acquisition unit.
(Supplementary Note 11)

The video monitoring apparatus according to any one of Supplementary notes 8 to 10, wherein
  the staying characteristic information includes at least one of information about a position and an orientation of a staying line that is a line along which a staying object lines up and is determined depending on the environmental object and information about a staying duration of the staying object, and
  in the determination of the position and pose, the level of hiding is calculated by calculating a spatial hiding level based on a relative azimuth angle and a distance between the staying line and the video acquisition unit, and a depression angle of the video acquisition unit, or by calculating a temporal hiding level based on the staying duration.

(Supplementary Note 12)

The method according to any one of Supplementary notes 8 to 10, wherein when the environmental object information includes information indicating a structural object which induces generation of a plurality of queues, and the staying characteristic information indicates the staying line along which the staying object lines up corresponding to each of the plurality of queues formed in front of the structural object, in the determination of the position and the pose, it is determined to install the video acquisition unit between the staying lines.
(Supplementary Note 13)

The method according to any one of Supplementary notes 8 to 10, wherein when the environmental object information includes information indicating a structural object which induces generation of a plurality of queues, the staying characteristic information indicates the staying line along which the staying object lines up corresponding to each of the plurality of queues formed in front of the structural object, and speeds at which the queues move differ from each other, in the determination of the position and the pose, it is determined to install the video acquisition unit closer to a side of the queue which moves faster than another queue with respect to a center between the queues.
(Supplementary Note 14)

The method according to any one of Supplementary notes 8 to 10, wherein when the environmental object information includes information indicating a passage and information indicating placed objects placed on the structural objects on both sides of the passage, and the staying characteristic information indicates that a staying level of the object differs from that of another object, in the determination of the position and the pose, it is determined to install the video acquisition unit to a position closer to the side in which the staying level is smaller than that of the other side with respect to a center of the passage.
(Supplementary Note 15)

A non-transitory computer readable medium storing a program for causing a computer to monitor inside a monitored area using a video acquisition unit, the program the computer to execute:
  a procedure of determining a position and an pose of the video acquisition unit in such a way that a level of hiding caused by overlapping of objects becomes low based on environmental object information indicating an environmental object including a structural object present in the monitored area and an placed object placed in the structural object and staying characteristic information indicating a staying characteristic of the object to be monitored determined depending on the environmental object; and
  a procedure of performing at least one of analyzing a video captured by the video acquisition unit at the determined position and the determined pose and displaying the video.

INDUSTRIAL APPLICABILITY

The video monitoring apparatus according to the present disclosure can be used as a video monitoring system which monitors various places indoors and outdoors, analyzes an object therein, issues an alert when a suspicious state or a dangerous state is detected. In particular, the video monitoring apparatus according to the present disclosure can be used for monitoring an area in which a plurality of objects to be monitored are present and where staying occurs in a specific place.

REFERENCE SIGNS LIST

101 ENVIRONMENTAL OBJECT INFORMATION STORAGE UNIT
102 ENVIRONMENTAL OBJECT DEPENDENT OBJECT STAYING CHARACTERISTIC INFORMATION STORAGE UNIT
103 POSITION AND POSE DETERMINATION UNIT
110 VIDEO ACQUISITION UNIT
111 ANALYSIS AND DISPLAY UNIT
203 POSITION AND POSE DETERMINATION UNIT
204 POSITION AND POSE CONTROL UNIT
210 VIDEO ACQUISITION UNIT
303 POSITION AND POSE DETERMINATION UNIT
305 OBJECT STATE ACQUISITION UNIT

The invention claimed is:

1. A video monitoring apparatus for monitoring inside a monitored area using at least one video acquisition unit, the video monitoring apparatus comprising:
at least one memory storing instructions; and
at least one processor configured to execute the instructions to:
determine a position and a pose of the at least one video acquisition unit to reduce hiding, caused by overlapping among different objects simultaneously appearing in a view of the at least one video acquisition unit, to become lower than a predetermined threshold level based on environmental object information and staying characteristic information;
generate control information for controlling the at least one video acquisition unit based on the position and the pose determined;
change the position and the pose of the at least video acquisition unit based on the control information; and
perform at least one of analyzing a video captured by the at least one video acquisition unit at the determined position and the determined pose, displaying the video and issuing an alert in accordance with a result of analyzing the video, wherein
the environmental object information indicates an environmental object including a structural object present in the monitored area and a placed object placed in or on the structural object, and
the staying characteristic information indicates a staying characteristic of each different object determined depending on the environmental object.

2. The video monitoring apparatus according to claim 1, wherein
the at least one processor is configured to execute the instructions to further acquire a state of each different object, and
the position and the pose of the at least one video acquisition unit are determined by further using the state of each different object.

3. The video monitoring apparatus according to claim 1, wherein
the staying characteristic information includes at least one of information about a position and an orientation of a staying line that is a line along which a staying object lines up and is determined depending on the environmental object, and information about a staying duration of the staying object, and
the at least one processor calculates a level of the hiding by calculating a spatial hiding level based on a relative azimuth angle and a distance between the staying line and the at least one video acquisition unit and, a depression angle of the at least one video acquisition unit, or by calculating a temporal hiding level based on the staying duration.

4. The video monitoring apparatus according to claim 3, wherein when the environmental object information includes information indicating the structural object which induces generation of a plurality of queues, and the staying characteristic information indicates the staying line along which the staying object lines up corresponding to each of the plurality of queues formed in front of the structural object, the at least one processor determines to position the at least one video acquisition unit between the staying line corresponding to each of the plurality of queues.

5. The video monitoring apparatus according to claim 3, wherein when the environmental object information includes information indicating the structural object which induces generation of a plurality of queues, the staying characteristic information indicates the staying line along which the staying object lines up corresponding to each of the plurality of queues formed in front of the structural object, and speeds at which the queues move differ from each other, the at least one processor determines to position the at least one video acquisition unit closer to a side of the queue which moves faster than another queue with respect to a center between the queues.

6. The video monitoring apparatus according to claim 1, wherein when the environmental object information includes information indicating a passage and information indicating additional placed objects placed on the structural objects on both sides of the passage, and the staying characteristic information indicates that a staying level of each different object differs from one another, the at least one processor determines to position the at least one video acquisition unit at a position closer to a side in which the staying level is smaller than that of another side with respect to a center of the passage.

7. The video monitoring apparatus according to claim 1, wherein the hiding is caused by overlapping among the different objects simultaneously appearing in a frame of the at least one video acquisition unit.

8. A video monitoring method for monitoring inside a monitored area using at least one video acquisition unit, the video monitoring method comprising:
determining, by a processor, a position and a pose of the at least one video acquisition unit to reduce hiding, caused by overlapping among different objects simultaneously appearing in a view of the at least one video acquisition unit, to become lower than a predetermined threshold level based on environmental object information and staying characteristic information;
generating, by the processor, control information for controlling the at least one video acquisition unit based on the position and the pose determined;
changing, by the processor, the position and the pose of the at least video acquisition unit based on the control information; and
performing, by the processor, at least one of analyzing a video captured by the at least one video acquisition unit at the determined position and the determined pose, displaying the video and issuing an alert in accordance with a result of analyzing the video, wherein
the environmental object information indicates an environmental object including a structural object present in the monitored area and a placed object placed in or on the structural object, and the staying characteristic information indicates a staying characteristic of each different object determined depending on the environmental object.

9. The video monitoring method according to claim 8, further comprising acquiring, by the processor, a state of each different object, wherein
the position and the pose of the at least one video acquisition unit are determined by further using the state of each different object.

10. The video monitoring method according to claim 8, wherein
the staying characteristic information includes at least one of information about a position and an orientation of a staying line that is a line along which a staying object lines up and is determined depending on the environmental object, and information about a staying duration of the staying object, and
the video monitoring method further comprises calculating, by the processor, a level of the hiding by calculating a spatial hiding level based on a relative azimuth angle and a distance between the staying line and the at least one video acquisition unit and, a depression angle of the at least one video acquisition unit, or by calculating a temporal hiding level based on the staying duration.

11. The video monitoring method according to claim 10, further comprising, when the environmental object information includes information indicating the structural object which induces generation of a plurality of queues, and the staying characteristic information indicates the staying line along which the staying object lines up corresponding to each of the plurality of queues formed in front of the structural object, determining, by the processor, to position the at least one video acquisition unit between the staying line corresponding to each of the plurality of queues.

12. The video monitoring method according to claim 10, further comprising, when the environmental object information includes information indicating the structural object which induces generation of a plurality of queues, the staying characteristic information indicates the staying line along which the staying object lines up corresponding to each of the plurality of queues formed in front of the structural object, and speeds at which the queues move differ from each other, the at least one processor determining, by the processor, to position the at least one video acquisition unit closer to a side of the queue which moves faster than another queue with respect to a center between the queues.

13. The video monitoring method according to claim 8, further comprising, when the environmental object information includes information indicating a passage and information indicating additional placed objects placed on the structural objects on both sides of the passage, and the staying characteristic information indicates that a staying level of each different object differs from one another, determining, by the processor, to position the at least one video acquisition unit at a position closer to a side in which the staying level is smaller than that of another side with respect to a center of the passage.

14. The video monitoring method according to claim 8, wherein the hiding is caused by overlapping among the different objects simultaneously appearing in a frame of the at least one video acquisition unit.

15. A non-transitory computer-readable data storage medium storing program code executable by a processor to perform processing for monitoring inside a monitored area using at least one video acquisition unit, the processing comprising:
determining a position and a pose of the at least one video acquisition unit to reduce hiding, caused by overlapping among different objects simultaneously appearing in a view of the at least one video acquisition unit, to become lower than a predetermined threshold level based on environmental object information and staying characteristic information;
generating control information for controlling the at least one video acquisition unit based on the position and the pose determined;
changing the position and the pose of the at least video acquisition unit based on the control information; and
performing at least one of analyzing a video captured by the at least one video acquisition unit at the determined position and the determined pose, displaying the video and issuing an alert in accordance with a result of analyzing the video, wherein
the environmental object information indicates an environmental object including a structural object present in the monitored area and a placed object placed in or on the structural object, and
the staying characteristic information indicates a staying characteristic of each different object determined depending on the environmental object.

16. The non-transitory computer-readable data storage medium according to claim 15, wherein the processing further comprises acquiring a state of each different object, wherein
the position and the pose of the at least one video acquisition unit are determined by further using the state of each different object.

17. The non-transitory computer-readable data storage medium according to claim 15, wherein
the staying characteristic information includes at least one of information about a position and an orientation of a staying line that is a line along which a staying object lines up and is determined depending on the environmental object, and information about a staying duration of the staying object, and
the processing further comprises calculating a level of the hiding by calculating a spatial hiding level based on a relative azimuth angle and a distance between the staying line and the at least one video acquisition unit and, a depression angle of the at least one video acquisition unit, or by calculating a temporal hiding level based on the staying duration.

18. The non-transitory computer-readable data storage medium according to claim 17, wherein the processing further comprises, when the environmental object information includes information indicating the structural object which induces generation of a plurality of queues, and the staying characteristic information indicates the staying line along which the staying object lines up corresponding to each of the plurality of queues formed in front of the structural object, determining to position the at least one video acquisition unit between the staying line corresponding to each of the plurality of queues.

19. The non-transitory computer-readable data storage medium according to claim 17, wherein the processing further comprises, when the environmental object information includes information indicating the structural object which induces generation of a plurality of queues, the staying characteristic information indicates the staying line along which the staying object lines up corresponding to each of the plurality of queues formed in front of the structural object, and speeds at which the queues move differ from each other, the at least one processor determining to position the at least one video acquisition unit closer to a side of the queue which moves faster than another queue with respect to a center between the queues.

20. The non-transitory computer-readable data storage medium according to claim 15, wherein the processing further comprises, when the environmental object information includes information indicating a passage and information indicating additional placed objects placed on the structural objects on both sides of the passage, and the staying characteristic information indicates that a staying level of each different object differs from one another, determining to position the at least one video acquisition unit at a position closer to a side in which the staying level is smaller than that of another side with respect to a center of the passage.

* * * * *